(12) United States Patent
Jameson

(10) Patent No.: US 8,292,747 B2
(45) Date of Patent: Oct. 23, 2012

(54) GREASE FILLED SPRING RETAINER

(75) Inventor: Jonathan Jameson, Dalton, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 167 days.

(21) Appl. No.: 12/841,727

(22) Filed: Jul. 22, 2010

(65) Prior Publication Data

US 2011/0021276 A1 Jan. 27, 2011

Related U.S. Application Data

(60) Provisional application No. 61/228,708, filed on Jul. 27, 2009.

(51) Int. Cl.
*F16F 15/123* (2006.01)
(52) U.S. Cl. ...................................... 464/67.1
(58) Field of Classification Search .............. 464/66.1, 464/67.1, 68.1, 68.9, 68.92; 192/30 V, 55.61, 192/70.17, 204, 213.11, 213.12, 213.21–214.1
See application file for complete search history.

(56) References Cited

U.S. PATENT DOCUMENTS

| | | | | |
|---|---|---|---|---|
| 5,377,560 A * | 1/1995 | Schierling et al. | ......... | 464/68.92 |
| 5,680,918 A | 10/1997 | Reik et al. | | |
| 5,695,403 A * | 12/1997 | Rohrle et al. | ............... | 192/213.3 |
| 6,699,131 B2 * | 3/2004 | Jackel et al. | .................. | 464/68.9 |
| 7,297,064 B2 * | 11/2007 | Jackel et al. | ............... | 464/68.92 |
| 2004/0248654 A1 * | 12/2004 | Jackel et al. | ............... | 464/68.92 |

FOREIGN PATENT DOCUMENTS

WO  WO 2007006254  *  1/2007

OTHER PUBLICATIONS

"Advantages of MIG Welding." Rodovens.com. Nov. 29, 2007, [online], [retrieved on Feb. 21, 2012] Retrieved from the Internet <URL:http://web.archive.org/web/20071129215151/http://www.rodovens.com/welding_articles/advantages_mig_welding.htm>.*
"Strengthening/Hardening Mechanisms." NDT Resource Center. Oct. 29, 2007, [online], [retrieved on Feb. 21, 2012] Retrieved from the Internet <URL: http://web.archive.org/web/20071029223105/http://www.ndt-ed.org/EducationResources/CommunityCollege/Materials/Structure/strengthening.htm>.*

* cited by examiner

*Primary Examiner* — Gregory Binda
*Assistant Examiner* — Josh Skroupa
(74) *Attorney, Agent, or Firm* — Simpson & Simpson, PLLC

(57) ABSTRACT

A spring retainer assembly, including: a flange plate; a plurality of springs in contact with a radially outer portion of the flange plate; a first cover plate; a second cover plate; a spring retainer; and at least one fastening device. The spring retainer and the first plate substantially surround respective outer circumferences of the plurality of springs; and the at least one fastening device is for fixedly connecting the spring retainer to a torque-transmitting device. In one embodiment, the spring retainer is axially fixed by the connection to the torque-transmitting device and includes a first portion, and contact of the first portion with the first plate positions the first plate in a desired axial position with respect to the plurality of springs. In one embodiment, the spring retainer includes a plurality of protrusions and a circumferential end for each spring is in contact with a respective protrusion.

18 Claims, 4 Drawing Sheets

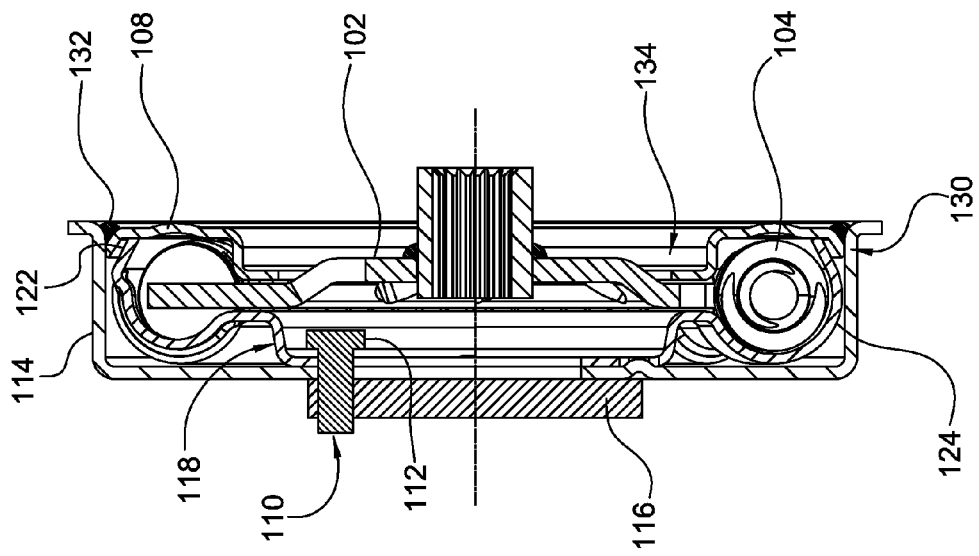
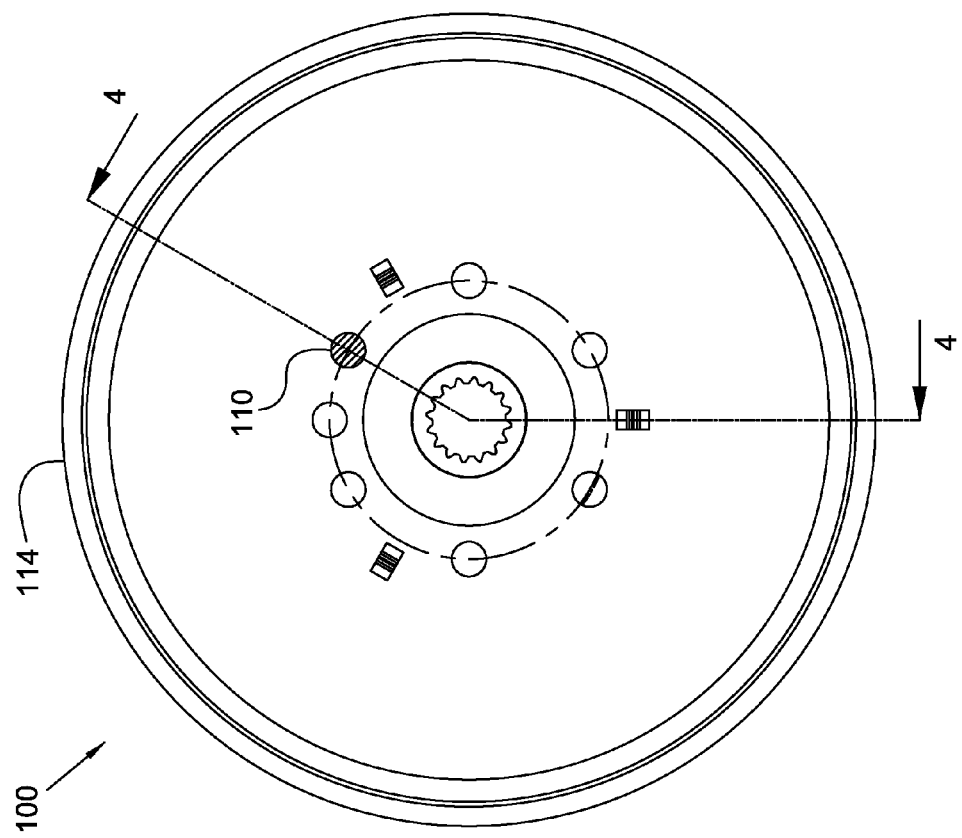
Fig. 4
Fig. 3

GREASE FILLED SPRING RETAINER

CROSS-REFERENCE TO RELATED APPLICATIONS

This application claims the benefit under 35 U.S.C. §119(e) of U.S. Provisional Application No. 61/228,708, filed Jul. 27, 2009.

FIELD OF THE INVENTION

The invention relates to a spring retainer, in particular, for a grease filled spring retainer for a damper assembly.

BACKGROUND OF THE INVENTION

The prior art teaches the use of separate parts or extra fabrication steps to perform various functions in the fabrication or operation of a damper assembly, such as radial spring retention, providing a smooth surface upon which springs can operate, washers for attachment to torque-transmitting devices, and stops.

BRIEF SUMMARY OF THE INVENTION

The present invention broadly comprises a spring retainer assembly, including: a flange plate; a plurality of springs in contact with a radially outer portion of the flange plate; a first cover plate; a second cover plate; a spring retainer; and at least one fastening device. The spring retainer and the first plate substantially surround respective outer circumferences of the plurality of springs; and the at least one fastening device is for fixedly connecting the spring retainer to a torque-transmitting device.

In one embodiment, the spring retainer is axially fixed by the connection to the torque-transmitting device and includes a first portion, and contact of the first portion with the first plate positions the first plate in a desired axial position with respect to the plurality of springs. In one embodiment, the spring retainer includes a plurality of protrusions and a circumferential end for each spring is in contact with a respective protrusion. In one embodiment, the plurality of protrusions are formed of a single piece of material with the spring retainer. In one embodiment, the assembly includes a plurality of spring holder pieces attached to the spring retainer and the plurality of spring holder pieces form the plurality of protrusions. In one embodiment, contact between the spring retainer and the first plate places the flange plate in a desired axial position. In one embodiment, the spring retainer is hardened. In one embodiment, the assembly includes an annular indentation formed by the first and second plates and facing in a substantially axial direction; and a metal inert gas weld, in the indentation, connecting the first and second cover plates.

The present invention also broadly comprises a spring retainer assembly, including: a flange plate; a plurality of springs in contact with a radially outer portion of the flange plate; a first cover plate; a second cover plate; and a spring retainer connected to the torque-transmitting device and axially fixed by the connection to the torque-transmitting device and including a first portion. The spring retainer and the first plate substantially surround respective outer circumferences of the plurality of springs and contact between the first portion of the spring retainer and the first plate positions the first plate in a desired axial orientation with respect to the plurality of springs.

In one embodiment, the assembly includes at least one fastening device, and the at least one fastening device secures the spring retainer to the torque-transmitting device. In one embodiment, the spring retainer includes a plurality of protrusions and a circumferential end for each spring is in contact with a respective protrusion. In one embodiment, the plurality of protrusions are formed of a single piece of material with the spring retainer. In one embodiment, the assembly includes a plurality of spring holder pieces attached to the spring retainer and the plurality of spring holder pieces form the plurality of protrusions. In one embodiment, the contact between the first portion of the spring retainer and the first plate places the flange plate in a desired axial position. In one embodiment, the spring retainer is hardened. In one embodiment, the assembly includes an annular indentation formed by the first and second plates and facing in a substantially axial direction and a metal inert gas weld, in the indentation, connecting the first and second cover plates.

The present invention further broadly comprises a spring retainer assembly, including: a flange plate; a plurality of springs in contact with a radially outer portion of the flange plate; a first cover plate; at least one fastening device; a second cover plate; and a spring retainer connected to a torque-transmitting device by the at least one fastening device and axially fixed by the connection to the torque-transmitting device and including a first portion. The spring retainer and the first plate substantially surround respective outer circumferences of the plurality of springs; and contact between the first portion of the spring retainer and the first plate positions the first plate in a desired axial orientation with respect to the second plate and the plurality of springs.

In one embodiment, the spring retainer includes a plurality of protrusions and a circumferential end for each spring is in contact with a respective protrusion. In one embodiment, the plurality of protrusions are formed of a single piece of material with the spring retainer. In one embodiment, the assembly includes a plurality of spring holder pieces attached to the spring retainer and the plurality of spring holder pieces form the plurality of protrusions. In one embodiment, the contact between the first portion of the spring retainer and the first plate places the flange plate in a desired axial position.

It is a general object of the present invention to provide a spring retainer assembly with multi-functional components and a reduced parts count.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which:

FIG. 2 is an exploded perspective view of a present invention spring retainer assembly;

FIG. 3 is a front view of the spring retainer assembly of FIG. 2;

FIG. 4 is a cross-sectional view of the spring retainer assembly of FIG. 2, generally along line 4-4 in FIG. 3;

FIG. 3 is a front view of the spring retainer assembly of FIG. 2;

FIG. 4 is a cross-sectional view of the spring retainer assembly of FIG. 2, generally along line 4-4 in FIG. 3; and, FIG. 5 is an exploded perspective view of a present invention spring retainer assembly.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1A:
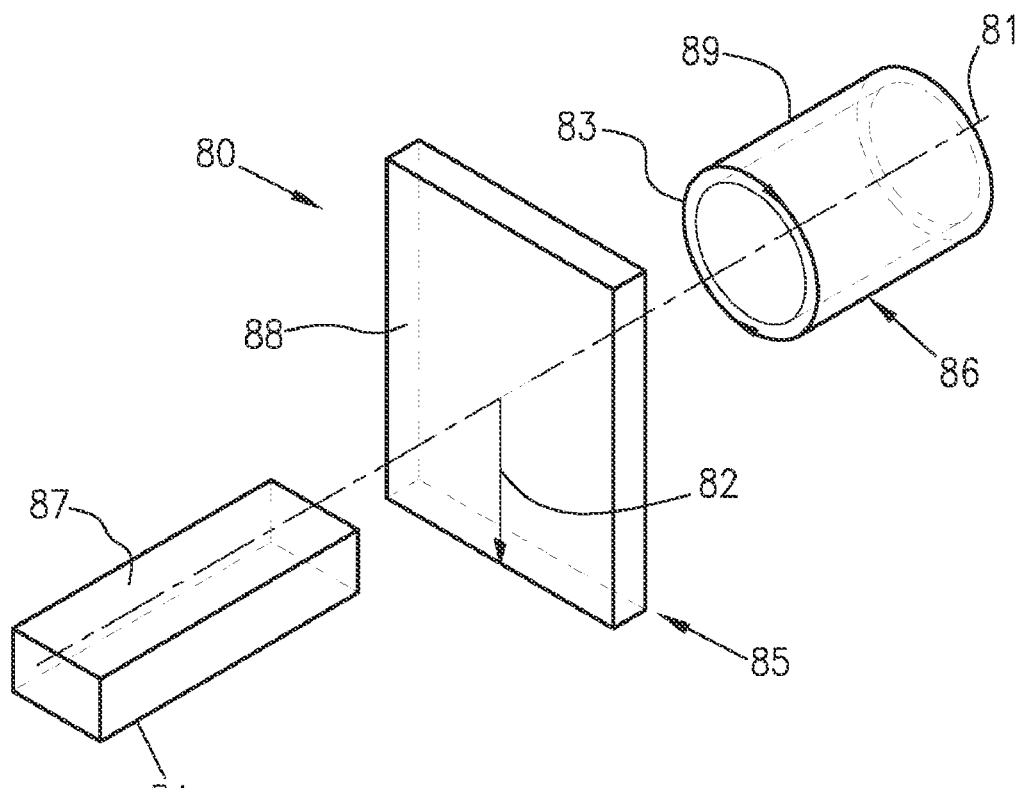
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
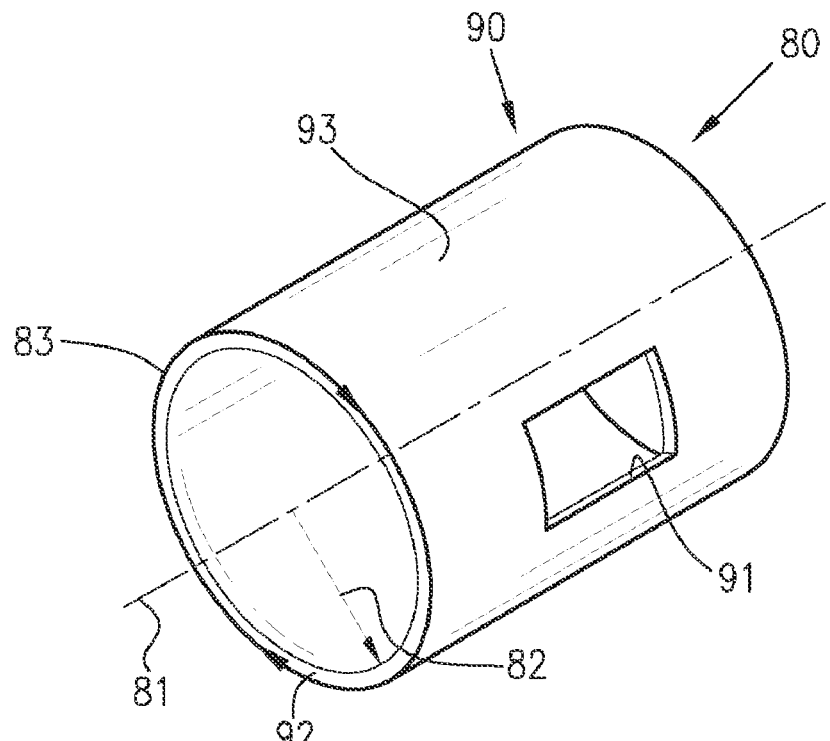
FIG. 1B is a perspective view of an object in the cylindrical coordinate system of FIG. 1A demonstrating spatial terminology used in the present application.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is part of a circumferential plane.

Figure 2:
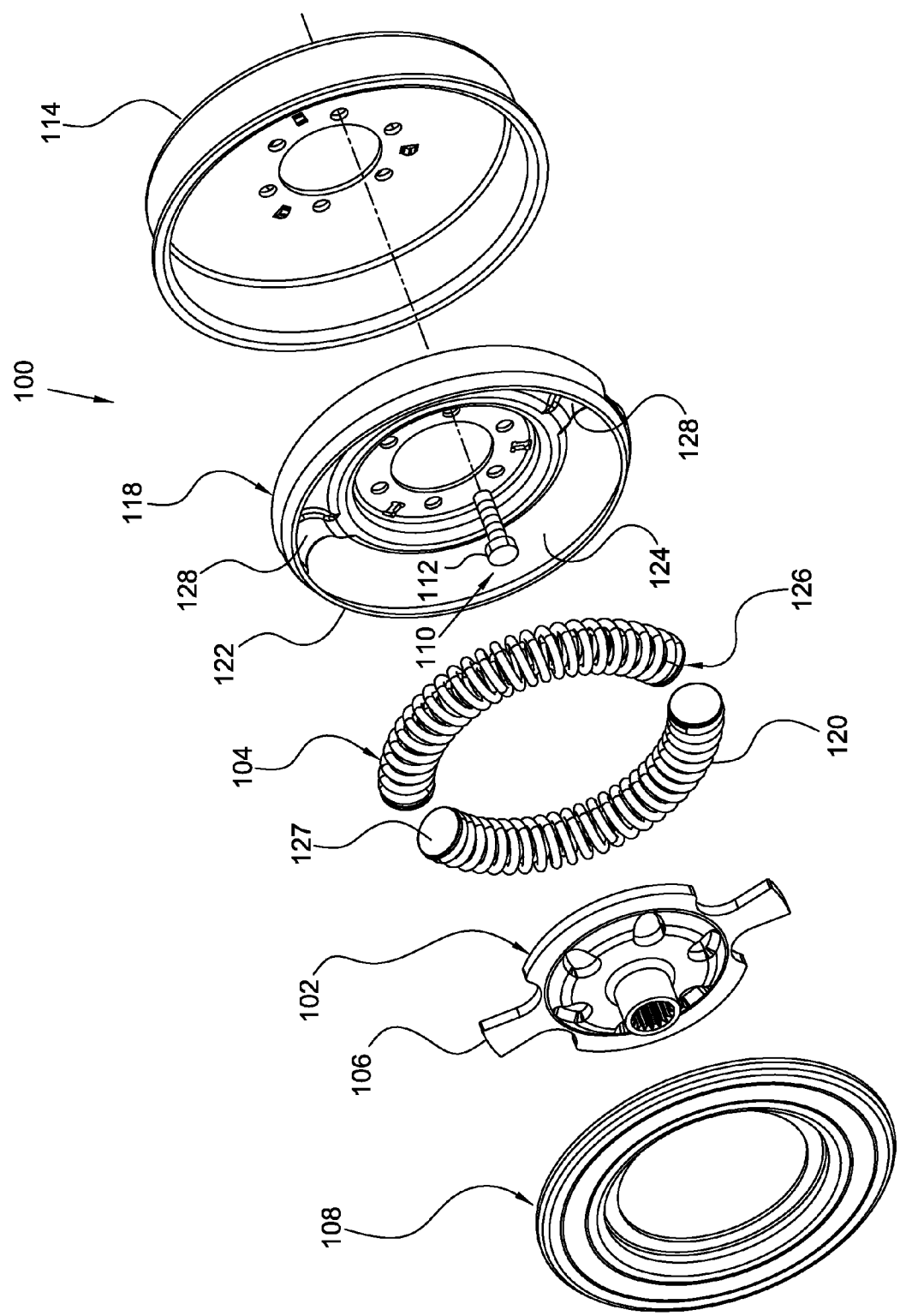
FIG. 2 is

FIG. 2 is an exploded perspective view of a present invention spring retainer assembly 100.

FIG. 3 is a front view of spring retainer assembly 100 of FIG. 2.

FIG. 4 is a cross-sectional view of spring retainer assembly 100 of FIG. 2, generally along line 4-4 in FIG. 3 and rotated so the top section line is at 12 o'clock. The following should be viewed in light of FIGS. 2-4. The spring retainer assembly includes flange plate 102, plurality of springs 104 in contact with radially outer portion 106 of the flange plate and cover plate 108. The assembly also includes at least one fastening device 110 with head 112 and cover plate 114. In one embodiment, cover plate 114 is connected to torque-transmitting device 116 (shown in FIG. 4) by the fastening device and axially fixed by the connection to the torque-transmitting device. In one embodiment (not shown), cover plate 114 is not connected to a torque-transmitting device. Note that only a single device 110 is shown in the figures, although a plurality of such devices would be used in practice. It should be understood that any fastening device known in the art can be used for device 110. In the figures a threaded fastener is shown as a non-limiting example.

The assembly further includes spring retainer 118 connected to the torque-transmitting device by the fastening device and axially fixed by the connection to the torque-transmitting device. In one embodiment, the head of the fastening device is in contact with the spring retainer. That is, the spring retainer acts as a washer for the fastening device, for example, resisting deformation due to compressive force applied by the fastening device and diffusing such compressive force across the retainer, thereby protecting plate 114. In one embodiment (not shown), a lock washer is disposed between the head of the fastening device and the spring retainer. The spring retainer and plate 108 substantially surround respective outer circumferences 120 of the springs. That is, the retainer and spring retain the springs.

Contact between portion 122 of the spring retainer and plate 108 positions plate 108 in a desired axial orientation, for example, with respect to plate 114 or the springs. Contact between portion 122 of the spring retainer and plate 108 or the springs positions flange plate 102 in a desired axial orientation. Thus, the spring retainer performs a multiplicity of useful functions. For example, portion 124 of the retainer provides radial restraint for the springs as well as a smooth surface along which the spring can expand and contract. Portion 122 of the retainer provides an axial stop that automatically positions plate 108 in a desired axial location. For example, the contact between portion 122 and plate 108 places plate 108 in an axial location that prevents plate 108 from crushing or otherwise undesirably inhibiting the operation of the springs while at the same time providing an axial restraint for the springs that places the flange plate in a desired axial position.

In one embodiment (not shown), a ring gear for a starter is engaged with plate 114.

The multiplicity of useful functions performed by the spring retainer also includes providing stops for the springs. In one embodiment, the spring retainer includes a plurality of protrusions and circumferential end 126 for each spring is in contact with a respective protrusion. In one embodiment, the circumferential end includes end cap 127. That is, the protrusions circumferentially restraining the springs in one direction. In one embodiment, for example, as shown in FIGS. 2-4, plurality of protrusions 128 are formed of a single piece of material with the spring retainer. That is, the protrusions are integral to the spring retainer. Thus, each spring is circumferentially restrained by a protrusion 128 and a portion 106 so that the springs provide a torque path from the torque-transmitting device to flange 102 through the spring retainer.

Figure 5:
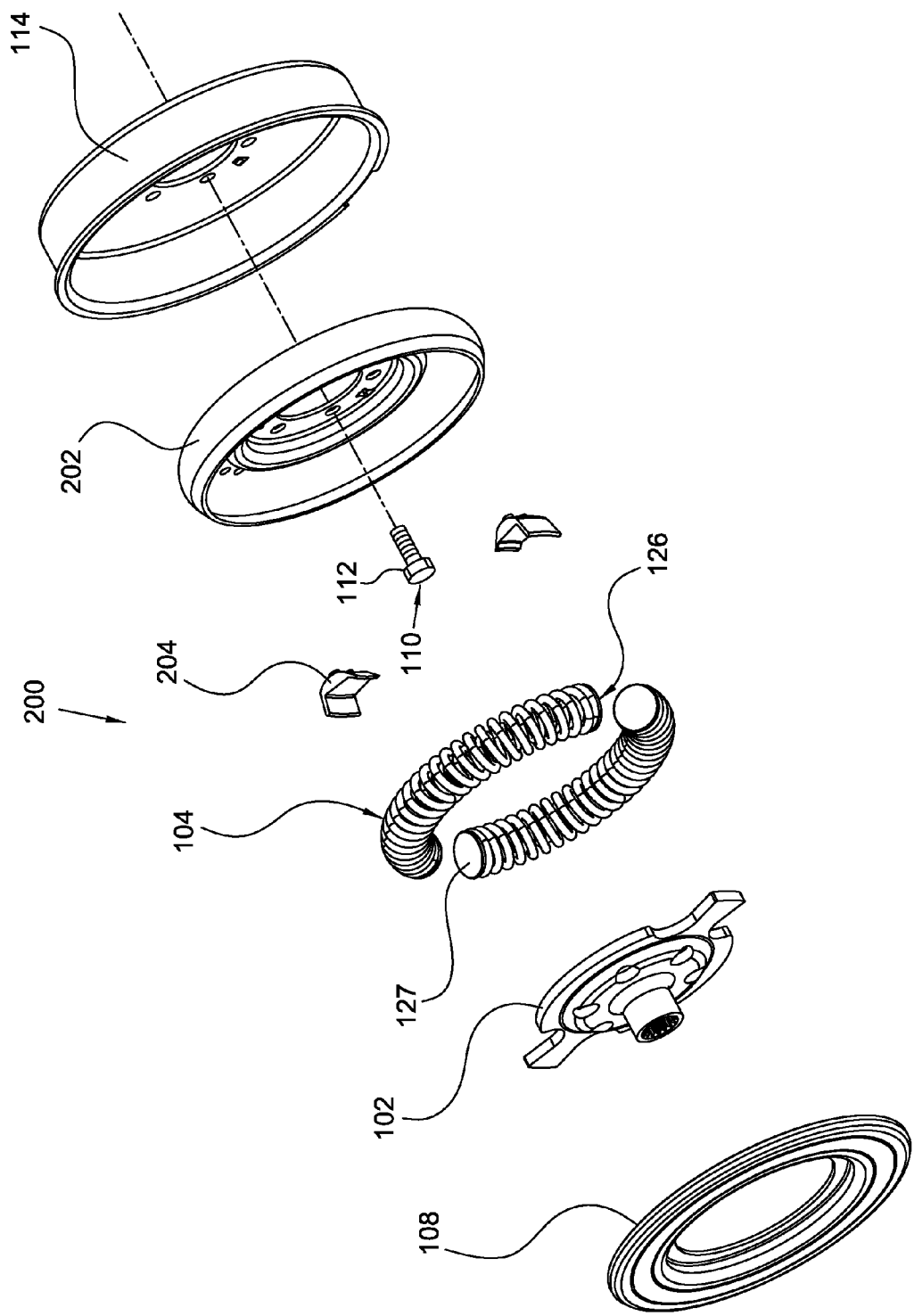

FIG. 5 is an exploded perspective view of a present invention spring retainer assembly 200. The following should be viewed in light of FIGS. 2-5. The components of assembly 200 are the same as those of assembly 100 with the exception of spring retainer 202 and plurality of spring holder pieces 204. As noted supra, a spring retainer includes a plurality of protrusions and circumferential end 126 for each spring is in contact with a respective protrusion. In one embodiment, for example, as shown in FIG. 5, the assembly includes a plurality of spring holder pieces 204 attached to the spring retainer and the plurality of spring holder pieces form the plurality of protrusions. For example, ends 126 rest against pieces 204. The spring holder pieces can be secured to the spring retainer by any means known in the art.

The multi-functionality of the spring retainer advantageously eliminates the need for additional parts and reduces tooling or fabrication requirements for other parts. For example, in contrast to the prior art which teaches the use of a plurality of elements to provide radial restraint and a smooth operating surface for the spring and a washer for connection to a torque-transmitting device, the spring retainer, as a single element, provides the preceding functions. Further, the fabrication of the cover plates is simplified since the spring retainer includes protrusions for circumferentially restraining the springs. That is, the spring retainer is used to transfer torque from device 116 to the flange through the springs. Also, portion 122 provides an axial stop for placement of plate 108, which eliminates the need to add parts specifically for this function or simplifies the devices and steps needed to assemble the spring retainer assembly.

Assembly 100 also simplifies and reduces cost for other fabrication steps. For example, in one embodiment, annular indentation 130 is formed by plates 108 and 114. Advantageously, the indention faces in a substantially axial direction and outward with respect to the assembly as a whole. Thus, the indention forms a joint of the elements to be joined, plates 108 and 114, which is easily accessible. As a result, elements to be welded are not shielded by other parts, for example, plate 108 does not overlap and block access to plate 114. Therefore, more expensive welding methods, such as laser welding, are not needed to melt overlapping parts and less expensive welding operations, such as metal inert gas (MIG) welding, can be used to join the exposed joint. For example, in one embodiment, MIG weld 132 in the indentation connects the cover plates.

In one embodiment, the spring retainer is hardened. In one embodiment, the annular space formed by the spring retainer and plate 108 is at least partially filled with grease. The relatively narrow opening in area 134 prevents the grease from seeping from the annular space when the assembly is at rest.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What I claim is:

1. A spring retainer assembly, comprising:
    an output including a flange plate;
    a plurality of springs in contact with a radially outer portion of the flange plate;
    a first cover plate;
    a second cover plate connected to the first cover plate such that movement of the first cover plate is fixed to movement of the second cover plate;
    a spring retainer; and,
    at least one fastening device, wherein:
        the spring retainer and the first plate substantially surround respective outer circumferences of the plurality of springs such that at least a portion of the at least one spring is disposed between the spring retainer and the first plate in an axial direction; and,
        the at least one fastening device is for fixedly connecting the spring retainer to a torque-transmitting device.

2. The spring retainer assembly of claim 1, wherein the spring retainer is axially fixed by the connection to the torque-transmitting device and includes a first portion and wherein contact of the first portion with the first plate positions the first plate in a desired axial position with respect to the plurality of springs.

3. The spring retainer assembly of claim 1, wherein the spring retainer includes a plurality of protrusions and wherein a circumferential end for each spring is in contact with a respective protrusion.

4. The spring retainer assembly of claim 3, wherein the plurality of protrusions are formed of a single piece of material with the spring retainer.

5. The spring retainer assembly of claim 3, further comprising a plurality of spring holder pieces attached to the spring retainer and wherein the plurality of spring holder pieces form the plurality of protrusions.

6. The spring retainer assembly of claim 1, wherein contact between the spring retainer and the first plate places the flange plate in a desired axial position.

7. The spring retainer assembly of claim 1, wherein the spring retainer is hardened.

8. The spring retainer assembly of claim 1, further comprising:
    an annular indentation formed by the first and second cover plates and facing in a substantially axial direction; and,
    a metal inert gas weld, in the indentation, connecting the first and second cover plates.

9. A spring retainer assembly, comprising:
    a flange plate;
    a plurality of springs in driving contact with a radially outer portion of the flange plate;
    a first cover plate;
    a second cover plate connected to the first cover plate such that movement of the first cover plate is fixed to movement of the second cover plate; and,
    a spring retainer arranged for connection to a torque-transmitting device, arranged to be axially fixed by the connection to the torque-transmitting device, and including a first portion, wherein:
        the spring retainer and the first plate substantially surround respective outer circumferences of the plurality of springs such that at least a portion of the at least one spring is disposed between the spring retainer and the first plate in an axial direction;
        the flange is at least partially rotatable with respect to the spring retainer and the first and second cover plates; and,
        contact between the first portion of the spring retainer and the first plate positions the first plate in a desired axial orientation with respect to the plurality of springs.

10. The spring retainer assembly of claim 9, wherein the spring retainer includes a plurality of protrusions and wherein a circumferential end for each spring is in contact with a respective protrusion.

11. The spring retainer assembly of claim 10, wherein the plurality of protrusions are formed of a single piece of material with the spring retainer.

12. The spring retainer assembly of claim 10, further comprising a plurality of spring holder pieces attached to the spring retainer and wherein the plurality of spring holder pieces form the plurality of protrusions.

13. The spring retainer assembly of claim 9, wherein contact between a first portion of the spring retainer and the first plate places the flange plate in a desired axial position.

14. The spring retainer assembly of claim 9, wherein the spring retainer is hardened.

15. The spring retainer assembly of claim 9, further comprising:
an annular indentation formed by the first and second cover plates and facing in a substantially axial direction; and,
a metal inert gas weld, in the indentation, connecting the first and second cover plates.

16. A spring retainer assembly, comprising:
a flange plate;
a plurality of springs in contact with a radially outer portion of the flange plate;
a first cover plate;
at least one fastening device;
a second cover plate:
connected to the first cover plate such that movement of the first cover plate is fixed to movement of the second cover plate;
connected to a torque-transmitting device by the at least one fastening device; and
axially fixed by the connection to the torque-transmitting device; and,
a spring retainer connected to the torque-transmitting device by the at least one fastening device and axially fixed by the connection to the torque-transmitting device and including a first portion and a plurality of protrusions, wherein:
the plurality of protrusions is fixedly connected to spring retainer or is formed from a single piece of material forming the spring retainer;
the at least one fastening device is for fixedly connecting the spring retainer to the torque-transmitting device;
the spring retainer and the first plate substantially surround respective outer circumferences of the plurality of springs;
contact between the first portion of the spring retainer and the first plate positions the first plate in a desired axial orientation with respect to the second plate and the plurality of springs; and,
a circumferential end for each spring is in contact with a respective protrusion.

17. The spring retainer assembly of claim 16, wherein contact between a first portion of the spring retainer and the first plate places the flange plate in a desired axial position.

18. The spring retainer assembly of claim 16, further comprising a plurality of spring holder pieces attached to the spring retainer and wherein the plurality of spring holder pieces form the plurality of protrusions.

* * * * *